United States Patent
Rees et al.

(10) Patent No.: US 10,223,104 B2
(45) Date of Patent: Mar. 5, 2019

(54) OPTIMIZING A BUILD PROCESS BY SCALING BUILD AGENTS BASED ON SYSTEM NEED

(71) Applicant: International Business Machines Corporation, Armonk, NY (US)

(72) Inventors: Christopher Rees, Cleveland, OH (US); Ryan W. Smith, Rocky River, OH (US)

(73) Assignee: International Business Machines Corporation, Armonk, NY (US)

( * ) Notice: Subject to any disclaimer, the term of this patent is extended or adjusted under 35 U.S.C. 154(b) by 20 days.

(21) Appl. No.: 15/178,699

(22) Filed: Jun. 10, 2016

(65) Prior Publication Data
US 2017/0357485 A1 Dec. 14, 2017

(51) Int. Cl.
G06F 8/71 (2018.01)

(52) U.S. Cl.
CPC .................. G06F 8/71 (2013.01)

(58) Field of Classification Search
CPC .................................... G06F 8/30
See application file for complete search history.

(56) References Cited

U.S. PATENT DOCUMENTS

| | | | |
|---|---|---|---|
| 6,658,453 B1 | 12/2003 | Dattatri | |
| 7,711,670 B2 | 5/2010 | Roediger | |
| 9,086,923 B2 | 7/2015 | Parashar et al. | |
| 2011/0239195 A1* | 9/2011 | Lin | G06F 8/71 717/126 |
| 2012/0072480 A1 | 3/2012 | Hays et al. | |
| 2016/0103677 A1* | 4/2016 | Melski | G06F 9/52 717/120 |
| 2016/0253625 A1* | 9/2016 | Casey | G06Q 10/103 717/101 |

FOREIGN PATENT DOCUMENTS

EP 1150212 A2 10/2001

OTHER PUBLICATIONS

Abbas et al., Organization of Multi-Agent Systems: An Overview, International Journal of Intelligent Information Sytems, 2015, 4(3): 46-57, Published online Jun. 26, 2015, http://www.sciencepublishinggroup.com/j/ijiis.

* cited by examiner

Primary Examiner — Li B. Zhen
Assistant Examiner — Amir Soltanzadeh
(74) Attorney, Agent, or Firm — Schmeiser, Olsen & Watts, LLP; Brian Restauro

(57) ABSTRACT

A method and system for optimizing a software-project build process are disclosed. A build-optimization system identifies build-dependency relationships between modules of a software project. Each dependency relationship specifies that a build agent cannot begin building a first module until a second module has been completely built. The system receives historical data from which the system forecasts durations of time required to build each module and durations of time required to prepare each build agent to begin building modules. The system determines an earliest possible starting time for each module build, determines how many agents must be available at each moment of time in order to concurrently build all modules capable of being built concurrently, and creates an optimal build schedule that specifies a latest time when each agent can be provisioned such that a build agent is available as soon as each module becomes available to be built.

19 Claims, 3 Drawing Sheets

OPTIMIZING A BUILD PROCESS BY SCALING BUILD AGENTS BASED ON SYSTEM NEED

TECHNICAL FIELD

The present invention relates to automated software-building technology and in particular to optimally scheduling the creation and operation of software build agents.

BACKGROUND

Complex software-development tasks may be automated by means of build agents, which are computer programs that automatically perform processor-intensive tasks necessary to build a software module. These tasks may include retrieving source files from a version-control system, provisioning a workspace, compiling code, running tests, or merging files back into version control.

Provisioning, launching, or running a build agent may consume significant system resources, so an automated project-build effort may run more efficiently if the number of agents is minimized or if an agent is not provisioned or launched until it is actually needed to perform a build.

Scheduling the provisioning of build agents is difficult in large projects in which complex build dependencies each require a first module to be completely built before a build agent can begin building a second module.

There is thus a need for a way to optimize automated software-building technology to solve the problem of efficiently scheduling the provisioning, launching, and running of build agents.

BRIEF SUMMARY

A first embodiment of the present invention provides a project-build optimization system that creates an optimal build schedule for a software project. The project is composed of software modules that are each built by a software build agent. Build-dependency relationships between pairs of modules each specify that a build agent may not begin building a first module of a pair until the second module of the pair has been completely built. The system uses historical records to forecast a duration of build time that required to build each module, and then uses those build times and the build dependencies to predict the earliest time that each module can become available to build. It then uses this information, along with knowledge of how long it will take to prepare each agent to begin building, in order to produce an optimized schedule that provisions the fewest number of build agents as late as possible, while ensuring that an agent is always available to build each module as soon as it becomes available.

A second embodiment of the present invention provides a method for optimizing a build process by scaling build agents. A project-build optimization system creates an optimal build schedule for a software project. The project is composed of software modules that are each built by a software build agent. Build-dependency relationships between pairs of modules each specify that a build agent may not begin building a first module of a pair until the second module of the pair has been completely built. The system uses historical records to forecast a duration of build time that required to build each module, and then uses those build times and the build dependencies to predict the earliest time that each module can become available to build. It then uses this information, along with knowledge of how long it will take to prepare each agent to begin building, in order to produce an optimized schedule that provisions the fewest number of build agents as late as possible, while ensuring that an agent is always available to build each module as soon as it becomes available.

A third embodiment of the present invention provides a computer program product that creates an optimal build schedule for a software project. The project is composed of software modules that are each built by a software build agent. Build-dependency relationships between pairs of modules each specify that a build agent may not begin building a first module of a pair until the second module of the pair has been completely built. The system uses historical records to forecast a duration of build time that required to build each module, and then uses those build times and the build dependencies to predict the earliest time that each module can become available to build. It then uses this information, along with knowledge of how long it will take to prepare each agent to begin building, in order to produce an optimized schedule that provisions the fewest number of build agents as late as possible, while ensuring that an agent is always available to build each module as soon as it becomes available.

DETAILED DESCRIPTION

The task of building a large software application or other project may be facilitated by using an automated build system, such as a continuous integration server system, to build each module of the project. Such build systems may create (or provision) and deploy temporary software build agents that each build one or more modules. A build agent may perform any sort of task related to building a software module, such as retrieving files from a version-control system, provisioning a workspace in a virtual or cloud computing environment, compiling code, testing compiled modules, or merging files back into the version-control system.

Because a build agent may consume significant processor and system resources, an agent that is not currently building a module is wasting resources. It is thus important to minimize the number of build agents created to build a project and to schedule the provisioning of each agent so as to minimize the time that the agent is not actively building.

A build system that scales up its build farm (the set of build agents) by creating a distinct agent for every module, theoretically allowing all modules to be built at the same time, would thus be enormously wasteful of resources. Furthermore, inter-module dependencies that require a first module to be completely built before an agent can begin building a second, dependent module, may make it impossible to build all modules at the same time.

But at the other extreme, using a single agent to build every module one at a time is also inefficient. Such a strategy would require an unacceptable duration of time in a larger project that comprises many thousands of modules.

Embodiments of the present invention provide a technical solution to this technical problem of optimizing a project build by identifying a time-efficient and resource-efficient compromise between these two extremes. Such solutions determine an optimal schedule for provisioning build agents such that an agent becomes available to build a software module as soon as it is possible to build that module, and then deprovision each agent as soon as it is no longer needed.

This approach involves organizing and scheduling the provisioning and deprovisioning of build agents as a function of inter-module dependencies and of an estimated build time for each module. Embodiments of the present invention identify this information from a dependency graph that identifies dependency relationships between pairs of modules, and from historical build data that makes it possible to forecast the duration of time required to build each module.

Figure 1:
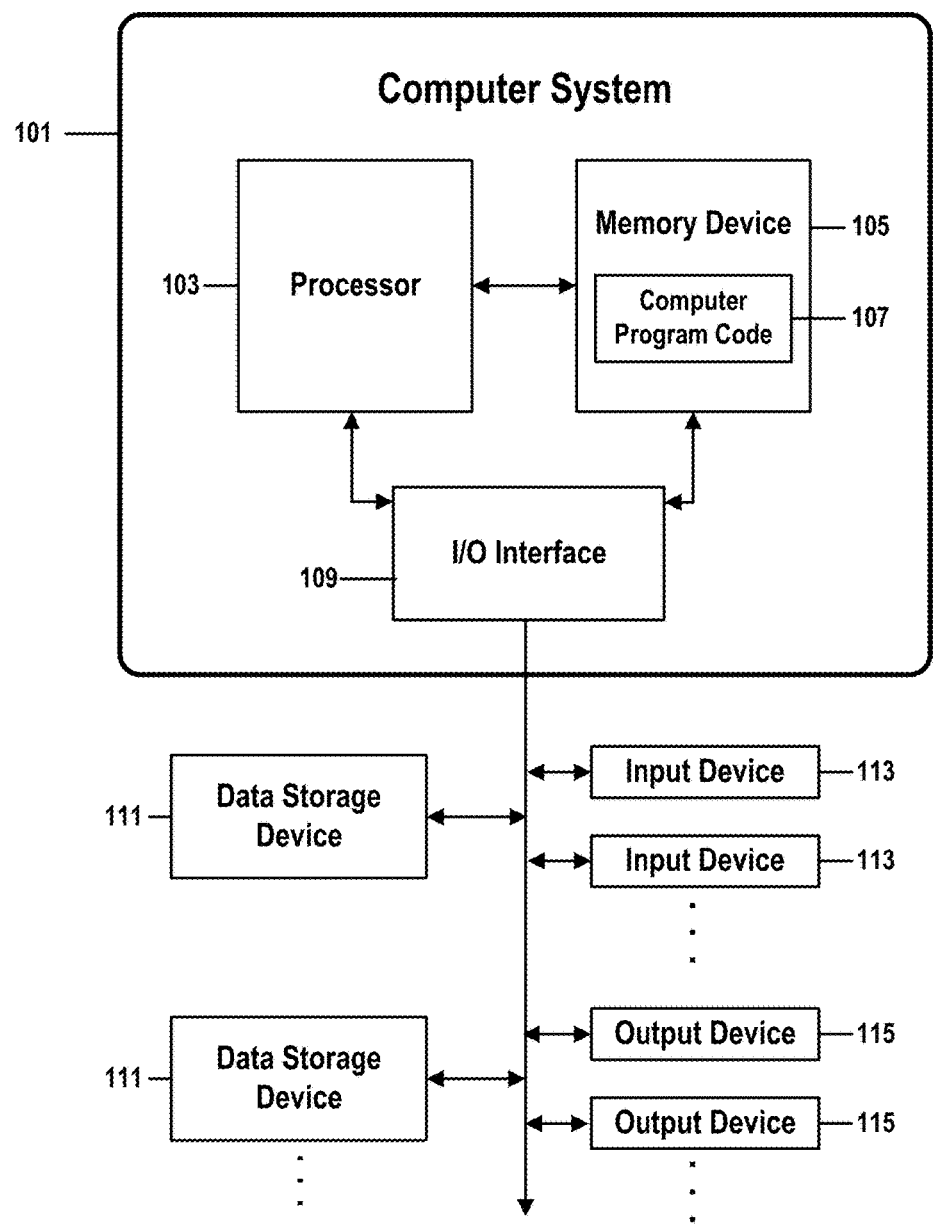
FIG. 1 shows the structure of a computer system and computer program code that may be used to implement a method for optimizing a build process by scaling build agents based on system need in accordance with embodiments of the present invention.

FIG. 1 shows a structure of a computer system and computer program code that may be used to implement a method for optimizing a build process by scaling build agents based on system need in accordance with embodiments of the present invention. FIG. 1 refers to objects 101-115.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for optimizing a build process by scaling build agents based on system need in accordance with embodiments of the present invention, and may implement other embodiments described in this specification, including the methods illustrated in FIGS. 1-3. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for optimizing a build process by scaling build agents based on system need.

Any of the components of the present invention could be created, integrated, hosted, maintained, deployed, managed, serviced, supported, etc. by a service provider who offers to facilitate a method for optimizing a build process by scaling build agents based on system need. Thus the present invention discloses a process for deploying or integrating computing infrastructure, comprising integrating computer-readable code into the computer system 101, wherein the code in combination with the computer system 101 is capable of performing a method for optimizing a build process by scaling build agents based on system need.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

While it is understood that program code 107 for a method for optimizing a build process by scaling build agents based on system need may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for a method for optimizing a build process by scaling build agents based on system need is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2A:
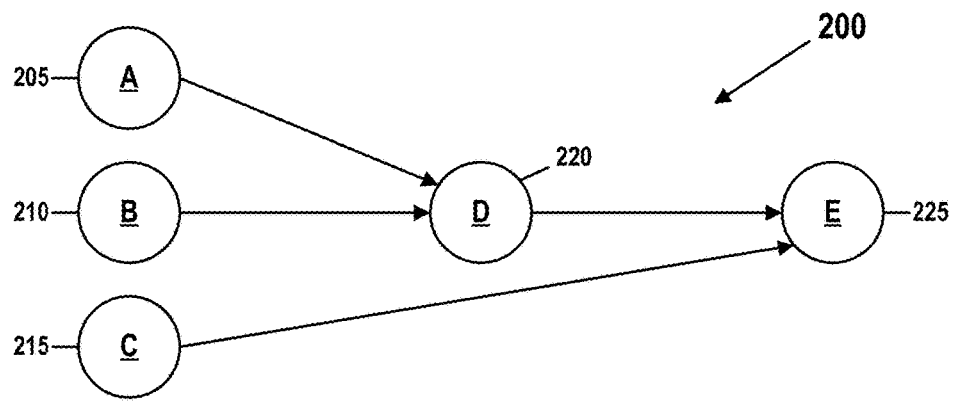
FIG. 2A is a first example of a dependency graph that identifies build-dependency relationships among modules of a software project to be built.

FIG. 2A is a first example of a dependency graph 200 that identifies build-dependency relationships among modules of a software project to be built. FIG. 2A comprises items 200-225.

Dependency graph 200 is a directed graph that represents modules of a software project. Each node of graph 200 represents one module, and nodes 205-225 respectively represent nodes A, B, C, D, and E.

Dependency relationships between pairs of nodes 205-225 are illustrated by arrows, and the direction of each arrow represents a direction of a corresponding relationship. For example, the arrow between node A 205 and node D 220, pointing toward D 220, shows that a task of building the module represented by node D 220 depends upon completion of a task of building the module represented by node A 205. That is, a build agent cannot begin building module D until module A is completely built.

FIG. 2A illustrates a build order in which agents must completely build nodes A 205 and B 210 before an agent can begin to build node D 220. Similarly, agents must completely build nodes C 215 and D 220 before an agent can begin to build node E 225.

There are many ways to provision and schedule build agents to perform these tasks. Two agents might, for example, be provisioned to build modules represented by nodes A 205 and B 210. Upon completion of those two tasks, the two agents (or two different agents) might then be used to build modules represented by nodes C 215 and D 220. Upon completion of those two tasks, one agent might be provisioned (or reused) to build the module represented by node E 225.

In another approach, three agents might be provisioned to build modules represented by nodes A 205, B 210, and C 215, then one agent to build the module represented by node D 220 and finally one last build agent to build the module represented by node E 225. It is possible to provision other combinations of build agents to build the project represented by graph 200, so long as the build order observes constraints imposed by the dependency relationships.

In a real-world build of a large project, which may comprise many thousands of modules, determining a most efficient way to build the project can become enormously complex. Embodiments of the present invention address this problem by identifying an optimal selection of build agents and scheduling the provisioning of these agents such that an agent becomes available at the earliest time that it is possible to begin building each module. Such optimal just-in-time scheduling requires consideration of factors such as inter-module dependencies; a likely duration of time necessary to provision, configure, or launch each build agent; and a likely duration of time required to build each module.

For example, if the time to build the module represented by node B 210 is much shorter than the time to build the module represented by node A 205, it might be possible to use the same agent to build both the B 210 module and the C 215 module. Such a build plan would reduce resource consumption without increasing build times by reducing the necessary number of build agents that must be simultaneously available.

Figure 2B:
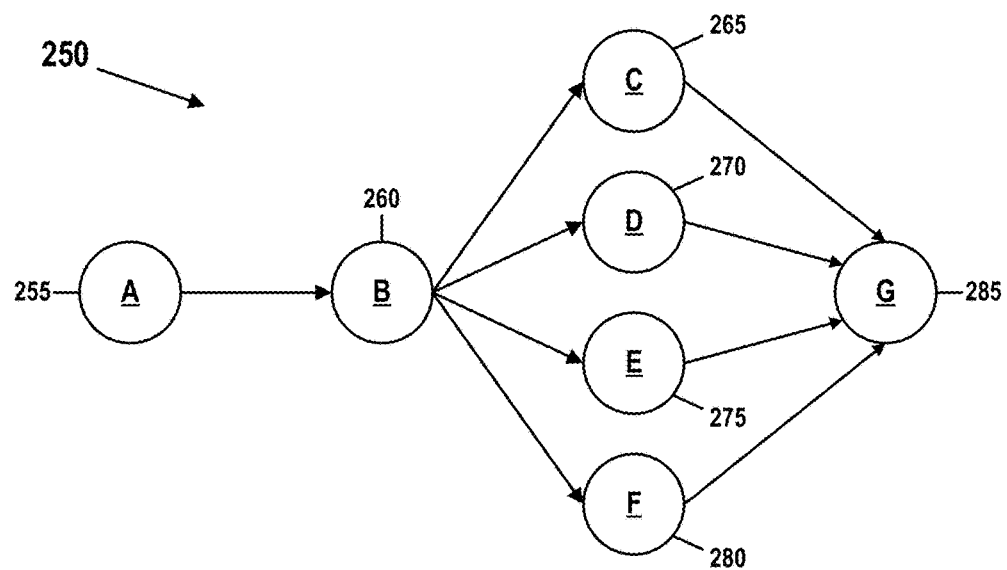
FIG. 2B is a second example of a dependency graph that identifies build-dependency relationships among modules of a software project to be built.

FIG. 2B is a second example of a dependency graph 250 that identifies build-dependency relationships among modules of a software project to be built. FIG. 2B comprises items 250-285.

As in FIG. 2A, FIG. 2B shows a dependency graph 250 that represents modules of a software project and represents dependency relationships between pairs of nodes as arrows. As above, nodes 255-285 respectively represent project modules A, B, C, D, E, F, and G.

Here, once the module represented by node A 255 is built, the module represented by node B 260 can be built, and after module B is built, the modules represented by nodes C 265, D 270, E, 275, and F 280 can be built. Finally, after all other modules represented by nodes of graph 250 have been built, it becomes possible to build the module represented by node G 285.

As in FIG. 2A, different sets of build agents, provisioned at different times, can satisfy the dependency relationships of graph 250. One build schedule might provision a first agent to build the module represented by node A 255, then ensure that a single agent was available to build the module represented by node B 260 as soon as A 255 was completely built. When the B 260 module is completely built, four more agents would become ready to build the four parallel modules that depend from the B 260 module, and a final agent would become available to build the final module as soon as the four parallel modules are complete.

Scheduling an optimal just-in-time build plan, however, is not possible without knowing how much time will likely be required to build each module. Generating a just-in-time build plan would also require knowledge of how long it takes to make available each build agent.

Figure 3:
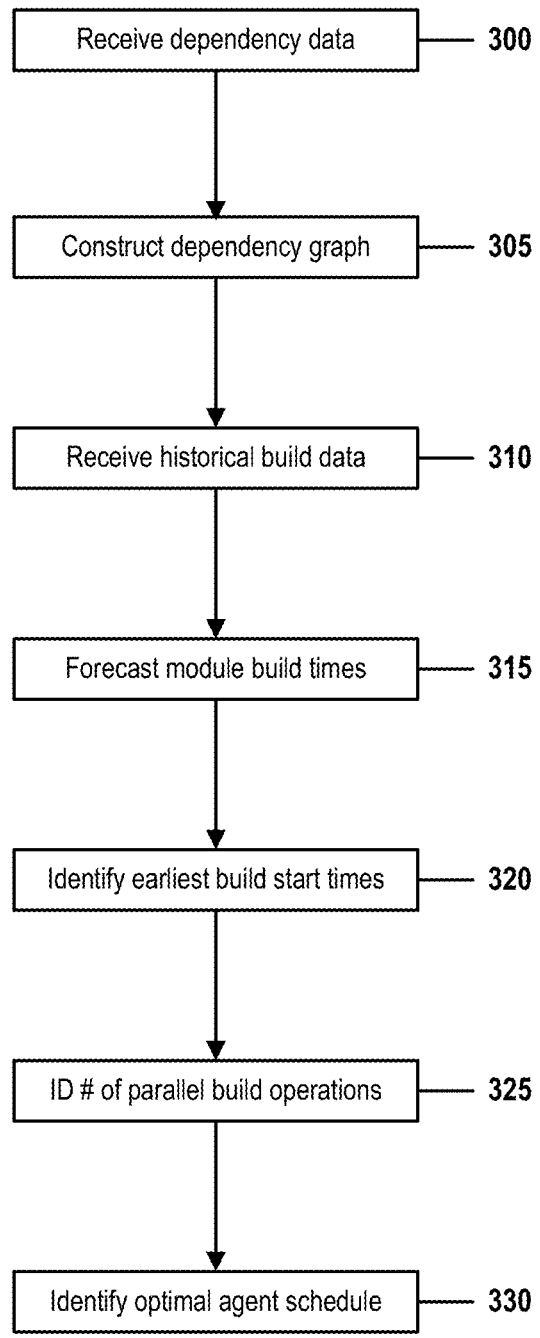
FIG. 3 is a flow chart that illustrates the steps of a method for optimizing a build process by scaling build agents based on system need in accordance with embodiments of the present invention.

FIG. 3 is a flow chart that illustrates steps of a method for optimizing a build process by scaling build agents based on system need in accordance with embodiments of the present invention. FIG. 3 contains steps 300-330.

In step 300, a project-build optimization system (such as a module of a continuous integration server, certain types of integrated development environments, and other types of software-development tools) receives information that identifies build-dependency relationships between pairs of modules of a project.

A build dependency between two modules identifies that a build agent may begin building a first module of the two modules (the "dependent" module) only after the second module of the two modules has been completely built. In cases where a dependent module can be built only when more than one other module has been built, a distinct build-dependency relationship will exist between the dependent module and each of the other modules upon which dependent module depends. If, for example, module A cannot start building until modules B and C are complete, a first build-dependency relationship identifies that A depends upon B and a second build-dependency relationship identifies that A depends upon C.

The dependency information may be received by any means known in the art. It may, for example, comprise a list of dependency relationships entered by a user through an interactive user interface, transferred from an integrated development environment or other software-entity that was used to create the modules, or inferred from a configuration file or project document.

In step 305, the system constructs from the data received in step 300 a dependency graph or other data structure that integrates the received build-dependency relationships for all modules of a project. This graph or other data structure will be referred to here simply as a "dependency graph" for purposes of readability.

FIGS. 2A and 2B show examples of dependency graphs formatted as directed graphs in which each node represents a module and each edge represents a build-dependency relationship between two modules. Some embodiments may represent the same information in other ways, such as by linked lists or database tables. In all cases, however, the dependency graph will identify which modules are in build-dependency relationships, such that a build agent must finish building a first module in such a relationship before beginning to build a second, dependent, module in the relationship.

In step 310, the system receives historical data about previous build efforts. This information may comprise system logs, application logs, or other types of archival data capable of identifying how long it took to build specific modules during previous build efforts under conditions similar to those of the current build effort.

In one example, the system in this step might receive a log file of previous builds compiled by an application that schedules software updates. This log file might list, among other things, the success rate of each build, the applications or projects associated with each build, or the duration of time required for each build.

In step 315, the system analyzes the historical data received in step 315 in order to forecast the duration of time that will be needed to build for each module comprised by the project to be built.

This forecast may be derived by any means known in the art. In a simple example, if the historic data reveals that four previous builds of a particular module took 39 seconds, 40 seconds, 41 seconds, and 40 seconds, the system might average these four figures to forecast a likely build time of 40 seconds.

Other embodiments may use other methods to forecast a likely build time, such as averaging historical build times of a particular module only after discarding the highest and lowest values, or by performing statistical functions or a regression analysis on historical build data.

If no historic data exists for a module of the current project, the system may estimate a build time for that module. This estimation may be performed by any means known in the art. For example, the system may base a forecasted build time on historic build times of modules that are similar to the module to be built in some way (such as module size, function, platform, programming language, or complexity). In other examples, if no historic data is available for a particular module, the system may arbitrarily choose a build time for that module that is an average of all build times of all modules (or of a subset of all modules) of the historic data, an average of all build times of all modules (or of a subset of all modules) of the project, or another type of preselected default value.

At the conclusion of step 315, the system will have created a logical representation of the build dependencies between modules of the project to be built, and will have forecast an expected duration of time that will be required to build each module.

In step 320, the system forecasts build start times for each module by walking through the directed graph. This step may be performed as functions of the known build dependencies and of the forecasted build times, but, in some embodiments, this step may also be performed as functions of other factors, such as an expected amount of time needed to provision a build agent or an expected amount of system resources needed to provision a build agent.

In some embodiments, only a certain class of build agents may be able to build certain modules. For example, if a first module is a software object that must be compiled under a Windows operating system and a second module is a binary library that will reside on a Linux platform, building the first module may require a Windows-specific agent and building the second module may require a Linux-specific agent. In such cases, the method step 320 may require consideration of which type of agent will be required to build each module. Such an embodiment will not be described in detail here, but those skilled in the art wo; be able to straightforwardly extend this step to account for the existence of multiple types of build agents.

The system may estimate build start times by traversing the directed graph, using any graph-traversal algorithm known in the art. Because the system in step 315 estimated a duration of time to build each module, an estimated earliest start time for each module may be determined by means of such a traversal. Examples of how this step might be performed on the dependency graphs of FIGS. 2A and 2B are described below.

In step 325, the system uses the build-start times identified in step 320 to identify the number of parallel, simultaneous, or concurrent build operations that will be performed at each moment in time. If one build agent is required to build one module, this number of build operations is equal to the number of build agents that will need to be available at each moment in time. This step may be performed by any means known in the art as a function of the dependency graph, the estimated module-build start times, and the estimated module-build durations.

For example, it is possible to identify the number of modules that are ready to be built at any particular moment of time by first chronologically sorting the previously determined earliest start times of the module-build operations and by then identifying the estimated completion time of each build operation as a function of the start times and of the previously forecast duration of time required to build each module. Organizing this information into a known type of chart, such as a Gantt chart, a timeline, or a bar graph, allows the system to straightforwardly identify how many build operations will be in progress at a particular moment of time and how many build agents must be available to build modules at a particular moment of time.

At the conclusion of step 325, the system will have constructed a representation that identifies a number of build operations that will be in progress at any particular moment of time during the project-build process.

In step 330, the system identifies an optimal build-agent schedule as a function of information derived or received in previous steps.

As described above, a number of functioning build agents required at any moment of time may be identified by simply traversing the timeline or other representation derived step 325, where one build agent is allocated for each build operation in progress at that moment.

The system may then determine an optimal time to begin provisioning each agent by initiating a provisioning process every time a new build operation is scheduled to begin or when a number of required build agents increases. Each provisioning process may be initiated such that an agent becomes ready to build a module as soon as the module is available to be built. This may be accomplished as a function of a provisioning time that is required to provision the type of agent required to build the module. This provisioning time may be determined as a function of expert knowledge of a person skilled in the field or may be inferred from the historical data.

If, for example, it is known that, on average, a Windows build agent requires 22 seconds to become ready to build a module, and if a module will become ready to build at 7:32:00 PM, the system in this step will determine that the task of provisioning the Windows build agent should begin at 7:31:38 PM, or 22 seconds before 7:32:00 PM.

Similarly, when the timeline derived in step 325 identifies that a number of required build agents decreases at a particular moment of time, the system will in step 330 identify a that one or more unneeded agents should be deprovisioned at that time.

At the completion of step 330, the system will have created a schedule that identifies optimal times for provisioning and deprovisioning each build agent, such that an agent becomes available as close as possible to the time at which a module is expected to become ready to build, and that an agent is deprovisioned as close as possible to the time at which it is no longer needed.

This schedule is based on build-start times, build durations, and other timing factors that may vary from estimated values during an actual build operation. However, minor deviations from forecasted times will not significantly affect the ability of embodiments to accurately schedule build agents.

If, for example, one module build completes early, the agent that built that module may either be terminated earlier than forecast, may sit idle for a minimum period of time, or may immediately begin building a next module that may have become ready to build earlier than expected. In other words, once the overall optimal build order has been established, minor deviations from expected build timing generally will not cause major losses in efficiency and, even when such deviations occur, the resulting project build will still generally be performed with greater resource efficiency and in less time than it would without the benefit of methods of the present invention.

The method of FIG. 3 may be illustrated by means of a first example based on the dependency graph of FIG. 2A.

In this example, the system receives dependency information that specifies that an agent may not begin building module E until modules D and C have been completely built and that an agent may not begin building module D until modules A and B have been completely built. From this information, the system can build the directed graph 200, which represents the five modules as nodes 205-225 and represents each dependency relationship as an edge between a pair of these nodes.

The system then receives historical information from which the system extracts the following module-build times (in mm:ss):

| Module | April 2014 Build | September 2014 Build | June 2015 Build | July 2016 Build |
|---|---|---|---|---|
| A | 1:32 | 1:27 | 2:01 | 1:28 |
| B | 1:00 | 1:00 | 1:24 | 1:00 |
| C | 2:30 | 2:35 | 2:45 | 2:22 |
| D | 0:18 | 0:14 | 0:16 | 0:20 |
| E | 2:02 | 2:08 | 2:26 | 2:00 |

By averaging these historic build times, the system forecasts likely build times for each module of the present project.

| Module | Forecasted Build Time |
|---|---|
| A | 1:37 |
| B | 1:06 |
| C | 2:33 |
| D | 0:17 |
| E | 2:09 |

The system next traverses graph 200 and, as a function of the build dependencies and of the forecasted build times, forecasts a set of earliest possible start times and a set of earliest possible completion times for each module:

| Module | Build Time | Earliest Start Time | Earliest Completion Time |
|---|---|---|---|
| A | 1:37 | 0:00 | 1:37 |
| B | 1:06 | 0:00 | 1:06 |
| C | 2:33 | 0:00 | 2:33 |
| D | 0:17 | 1:37 | 1:54 |
| E | 2:09 | 2:33 | 4:42 |

Here, modules A, B, and C are not dependent upon any other modules, so agents may begin building each of them immediately, at time 0:00. Module D cannot be built until both A and B are complete, so the earliest time at which to build module D is 1:37, the later of the two A and B completion times. Module E cannot be built until the later of the completion times modules C and D, respectively 2:33 and 1:54. So, under ideal conditions, a build agent may be expected to be able to begin building module E at 2:33.

The system next constructs a representation of how many build agents must be available at each moment in time to build modules throughout the duration of the project. There are many ways to represent this information. The chart below, for example, shows the total number of agents concurrently building projects at any particular time.

| Time Period (sec) | Modules Being Built | Total # Agents |
|---|---|---|
| −0:30-0:00 | NA | 0 |
| 0:00-1:06 | A, B, C | 3 |
| 1:06-1:37 | A, C | 2 |
| 1:37-1:54 | C, D | 2 |
| 1:54-2:33 | C | 1 |
| 2:33-4:42 | E | 1 |

From this chart, it can be seen that no agents are required to build modules prior to the project-build start time at 0:00. From the period 0:00-1:06, three agents are needed to build modules A, B, and C. When module B is completely built at 1:06, this number drops to two agents. At 1:37, module A completes and module D begins. Here, the optimal organization of the build process may allow the agent that had been building module A to immediately begin building module D. At 1:54, module D has been completely built, allowing another build agent to be deprovisioned. At 2:33, the last remaining build agent completes building module C just in time to begin building module E. At 4:42, module E has been completely built and the last remaining agent may be deprovisioned.

If it takes 30 seconds to provision an agent, the above information may be used in a straightforward manner to generate a schedule that identifies when to provision each agent:

| Time | # Agents to Provision | # Agents to Deprovision |
|---|---|---|
| −0:30 | 3 | 0 |
| 1:06 | 0 | 1 |
| 1:07 | 1 | 0 |
| 1:37 | 0 | 1 |
| 1:54 | 0 | 1 |
| 2:03 | 1 | 0 |
| 2:33 | 0 | 1 |
| 4:42 | 0 | 1 |

Here, each agent is provisioned 30 seconds before a module is expected to become ready to build and each agent is deprovisioned as soon as it completes building a module.

Further efficiencies can be derived through straightforward means known to those skilled in the art. For example, if the difference in times between the time at which one agent is deprovisioned and the time a subsequent agent is provisioned is less than the provisioning time required to provision a new build agent (in this example, 30 seconds), the system may conserve resources by omitting both the deprovisioning and the provisioning tasks, allowing a single agent to briefly idle until the next module becomes ready to build. Similarly, adjacent provisioning and deprovisioning tasks might be omitted if the duration of time between one module's completion time and the next scheduled build-start time is less than the provisioning time. In other embodiments, adjacent provisioning and deprovisioning tasks may be omitted as a function of other threshold conditions.

In the above example, this might mean omitting the deprovisioning task scheduled to occur at 1:06 and the deprovisioning task scheduled to begin one second later, at 1:07. Instead of performing both tasks, the agent that had just finished building module B might be held idle until module D becomes ready to build. Here, the difference between the scheduled provisioning time and the time at which module D might become ready to build is 31 seconds, but some embodiments might still automatically omit the provisioning and deprovisioning tasks if performing the provisioning and deprovisioning requires greater resources than would allowing an agent to remain idle for 31 seconds, or if there is a known reasonable chance that module B might complete at a time later than forecast or that module D might become ready to build at a time earlier than forecast.

The exact rules by which such compaction of provisioning and deprovisioning tasks might be performed are implementation-dependent, and may be functions of factors such as a resource consumption of a provisioning or deprovisioning task, a resource consumption of an idle build agent, an expected accuracy of a forecast build time, a total amount of resources available for a build project, or an expected amount of time available to complete an entire project build.

It can be seen from this example that, despite an inability to predict with 100% accuracy the amount of time required to build each module, embodiments of the present invention may identify an optimal compromise between attaining a lowest total project-build time and a lowest total resource consumption required by that build, and that this compromise is sufficiently resilient to accommodate minor deviations from the forecasted build times.

A similar procedure may be applied to the exemplary dependency graph of FIG. 2B.

As before, build times for each module A-G may be forecast by averaging received historic build times. In this example, those forecasted build times might be:

| Module | Forecasted Build Time |
|---|---|
| A | 0:10 |
| B | 0:50 |
| C | 0:30 |
| D | 0:52 |
| E | 1:00 |
| F | 0:37 |
| G | 0:05 |

Plugging these figures into the dependency graph of FIG. 2B yields the following estimated build start and build completion times:

| Module | Build Time | Earliest Start Time | Termination Time |
|---|---|---|---|
| A | 0:10 | 0:00 | 0:10 |
| B | 0:50 | 0:10 | 1:00 |
| C | 0:30 | 1:00 | 1:30 |
| D | 0:52 | 1:00 | 1:52 |
| E | 1:00 | 1:00 | 2:00 |
| F | 0:37 | 1:00 | 1:37 |
| G | 0:05 | 2:00 | 2:05 |

If it takes 10 seconds to provision a build agent, a procedure similar to that of the previous FIG. 2A example produces in the following agent schedule:

| Time  | # Agents to Provision | # Agents to Deprovision |
|-------|-----------------------|-------------------------|
| −0.10 | 1                     | 0                       |
| 0:50  | 3                     | 0                       |
| 1:30  | 0                     | 1                       |
| 1:52  | 0                     | 1                       |
| 1:37  | 0                     | 1                       |
| 2:05  | 0                     | 1                       |

Here, the build agent that completes module A at 0:10 begins building module B as soon as B becomes ready to build at 0:10. Similarly, the build agent that completes module E at 2:00 begins building module G as soon as G becomes ready to build at 2:00. These optimizations allow the project build to eliminate what would have been two pairs of resource-consuming provisioning and deprovisioning tasks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A project-build optimization system comprising a processor, a memory coupled to the processor, and a computer-readable hardware storage device coupled to the processor, the storage device containing program code configured to be run by the processor via the memory to implement a method for optimizing a build process by scaling build agents based on system need, the method comprising:
    the system creating a dependency graph of a project to be built,
        where the project comprises two or more modules,
        where building the project comprises building every module of the two or modules,
        where every agent of the build agents is capable of building any module of the two or more modules
        where the dependency graph identifies build-dependency relationships between pairs of the two or more modules,
        where the dependency graph is a directed graph that consists of nodes and edges, where each node represents a module of the two or more modules and each edge represents a dependency relationship of the build-dependency relationships,
        where a first pair of vertices of the dependency graph identifies a first pair of modules of the two or modules and a first edge connecting the first pair of modules represents a corresponding build-dependency relationship between the first pair of modules,
        where the dependency graph does not comprise information about the duration of any task required to build any module of the two or more modules, and
    where optimizing the build process comprises provisioning a set of software build agents such that a build agent of the set of agents is available to build each module of the two or more modules that is not barred from being built by a dependency relationship of the build-dependency relationships, and further comprises minimizing a total number of build agents of the set of agents required to complete the build process at all times during the build process;
    the system receiving historical build data for each module of the two or more modules;
    the system forecasting a build time for each of the two or more modules as a function of the historical build data; and
    the system deriving, as a function of the build-dependency relationships and of the forecasted build times, an optimal build schedule that specifies times at which to provision and deprovision each build agent of the set agents.

2. The system of claim 1, where the historical build data comprises information from which can be inferred one or more previous build times of a first module of the two or more modules, where the one or more previous build times each identify a duration of time that had been required by a build agent of the set of agents to build the first module during a previous build process.

3. The system of claim 2, where the forecasted build time for the first module is an average of the one or more previous build times.

4. The system of claim 1, where a build time of a first module of the two or more modules is a duration of time required for a build agent of the set of agents to build the first module.

5. The system of claim 4, where the deriving is performed as a further function of the build-dependency relationships and of the forecasted build times, and where the optimal build schedule specifies when each module of the two or more modules will become available to build.

6. The system of claim 1, where a first dependency relationship of the build-dependency relationships specifies that a first module of the two or more modules becomes available to build only after a second module of the two or more modules has been completely built.

7. The system of claim 6, where the deriving is performed as a further function of the build-dependency relationships and of the forecasted build times, and where the optimal build schedule specifies the latest time when a first build agent of the set of agents can be provisioned such that the first build agent is ready to build the first module when the second module has been completely built.

8. The system of claim 7, further comprising:
    the system inferring from the historical build data a provisioning time of the first build agent,
    where the provisioning time identifies a duration of time required to prepare the first build agent to build the first module, and
    where the latest time is specified as a function of the provisioning time.

9. A method for optimizing a build process by scaling build agents based on system need, the method comprising:
    creating a dependency graph of a project to be built,
        where the project comprises two or more modules,
        where building the project comprises building every module of the two or modules,
        where every agent of the build agents is capable of building any module of the two or more modules
        where the dependency graph identifies build-dependency relationships between pairs of the two or more modules, where a first pair of vertices of the dependency graph identifies a first pair of modules of the two or modules and a first edge connecting the first pair of modules represents a corresponding relationship, of the build-dependency relationships, between the first pair of modules, where the dependency graph does not comprise information about the duration of any task required to build any module of the two or more modules, where a first dependency relationship of the build-dependency relationships specifies that a first module of the two or more modules becomes available to build only after a second module of the two or more modules has been completely built, where the dependency graph is a directed graph that consists of nodes and edges, where each node represents a module of the two or more modules and each edge represents a dependency relationship of the build-dependency relationships, and where optimizing the build process comprises provisioning a set of software build agents such that a build agent of the set of agents is available to build each module of the two or more modules that is not barred from being built by a dependency relationship of the build-dependency relationships, and further comprises minimizing a total number of build agents of the set of agents required to complete the build process at all times during the build process;

receiving historical build data for each module of the two or more modules;

forecasting a build time for each of the two or more modules as a function of the historical build data, where a build time of the first module of the two or more modules is a duration of time required for a build agent of the set of agents to build the first module; and deriving, as a function of the build-dependency relationships and of the forecasted build times, an optimal build schedule that specifies times at which to provision and deprovision each build agent of the set agents.

10. The method of claim 9, where the historical build data comprises information from which can be inferred one or more previous build times of the first module of the two or more modules, where the one or more previous build times each identify a duration of time that had been required by a build agent of the set of agents to build the first module during a previous build process.

11. The method of claim 9, where the deriving is performed as a further function of the build-dependency relationships and of the forecasted build times, and where the optimal build schedule specifies when each module of the two or more modules will become available to build.

12. The method of claim 9, where the deriving is performed as a further function of the build-dependency relationships and of the forecasted build times, and where the optimal build schedule specifies the latest time when a first build agent of the set of agents can be provisioned such that the first build agent is ready to build the first module when the second module has been completely built.

13. The method of claim 12, further comprising:
the system inferring from the historical build data a provisioning time of the first build agent,
where the provisioning time identifies a duration of time required to prepare the first build agent to build the first module, and
where the latest time is specified as a function of the provisioning time.

14. The method of claim 9, further comprising providing at least one support service for at least one of creating, integrating, hosting, maintaining, and deploying computer-readable program code in the computer system, wherein the computer-readable program code in combination with the computer system is configured to implement the creating, the receiving, the forecasting, and the deriving.

15. A computer program product, comprising a computer-readable hardware storage device having a computer-readable program code stored therein, the program code configured to be executed by a project-build optimization system comprising a processor, a memory coupled to the processor, and a computer-readable hardware storage device coupled to the processor, the storage device containing program code configured to be run by the processor via the memory to implement a method for optimizing a build process by scaling build agents based on system need, the method comprising:

creating a dependency graph of a project to be built,
where the project comprises two or more modules,
where building the project comprises building every module of the two or modules,
where every agent of the build agents is capable of building any module of the two or more modules
where the dependency graph identifies build-dependency relationships between pairs of the two or more modules,
where a first pair of vertices of the dependency graph identifies a first pair of modules of the two or modules and a first edge connecting the first pair of modules represents a corresponding build-dependency relationship between the first pair of modules,
where the dependency graph does not comprise information about the duration of any task required to build any module of the two or more modules,
where a first dependency relationship of the build-dependency relationships specifies that a first module of the two or more modules becomes available to build only after a second module of the two or more modules has been completely built,
where the dependency graph is a directed graph that consists of nodes and edges, where each node represents a module of the two or more modules and each edge represents a dependency relationship of the build-dependency relationships, and
where optimizing the build process comprises provisioning a set of software build agents such that a build agent of the set of agents is available to build each module of the two or more modules that is not barred from being built by a dependency relationship of the build-dependency relationships, and further comprises minimizing a total number of build agents of the set of agents required to complete the build process at all times during the build process;

receiving historical build data for each module of the two or more modules;

forecasting a build time for each of the two or more modules as a function of the historical build data, where a build time of the first module of the two or more modules is a duration of time required for a build agent of the set of agents to build the first module; and deriving, as a function of the build-dependency relationships and of the forecasted build times, an optimal build schedule that specifies times at which to provision and deprovision each build agent of the set agents.

16. The computer program product of claim 15, where the historical build data comprises information from which can be inferred one or more previous build times of the first module of the two or more modules, where the one or more previous build times each identify a duration of time that had been required by a build agent of the set of agents to build the first module during a previous build process.

17. The computer program product of claim 15, where the deriving is performed as a further function of the build-dependency relationships and of the forecasted build times, and where the optimal build schedule specifies when each module of the two or more modules will become available to build.

18. The computer program product of claim 15, where the deriving is performed as a further function of the build-dependency relationships and of the forecasted build times, and where the optimal build schedule specifies the latest time when a first build agent of the set of agents can be provisioned such that the first build agent is ready to build the first module when the second module has been completely built.

19. The computer program product of claim 18, further comprising:
   the system inferring from the historical build data a provisioning time of the first build agent,
   where the provisioning time identifies a duration of time required to prepare the first build agent to build the first module, and
   where the latest time is specified as a function of the provisioning time.

* * * * *